(12) United States Patent
Samson

(10) Patent No.: US 6,627,240 B1
(45) Date of Patent: Sep. 30, 2003

(54) METHOD FOR MARINATING MEAT

(76) Inventor: Allan D. Samson, 16 Cherry Cir., Glen Mills, PA (US) 19342-1273

( * ) Notice: Subject to any disclaimer, the term of this patent is extended or adjusted under 35 U.S.C. 154(b) by 0 days.

(21) Appl. No.: 10/270,105

(22) Filed: Oct. 15, 2002

Related U.S. Application Data

(60) Provisional application No. 60/350,960, filed on Jan. 25, 2002.

(51) Int. Cl.[7] .............................................. A23L 1/318
(52) U.S. Cl. ..................... 426/281; 426/291; 426/641
(58) Field of Search ................................ 426/281, 291, 426/641

(56) References Cited

U.S. PATENT DOCUMENTS

| | | | | |
|---|---|---|---|---|
| 4,663,173 A | * | 5/1987 | Clatfelter et al. ........... 426/281 |
| 4,940,590 A | * | 7/1990 | Williams et al. ......... 426/641 X |
| 4,960,599 A | * | 10/1990 | Cozzini et al. .............. 426/281 |
| 5,505,972 A | * | 4/1996 | Ludwig ....................... 426/281 |
| 6,040,013 A | * | 3/2000 | Karales ....................... 426/281 |

* cited by examiner

Primary Examiner—Arthur L. Corbin
(74) Attorney, Agent, or Firm—Howrey Simon Arnold & White, LLP; Michael J. Stimson

(57) ABSTRACT

Methods and devices are presented for the continuous, in-line marinating, flavoring, and freeze-processing meat. The methods involve injecting meat with a first set of ingredients, coating the meat with a second set of ingredients, spraying meat with a third set of ingredients, freezing the surface of the meat, freezing the meat throughout, and submerging the meat in a fourth set of ingredients.

10 Claims, 3 Drawing Sheets

METHOD FOR MARINATING MEAT

RELATION TO PRIOR APPLICATION

This application claims priority to U.S. Provisional Patent Application Serial No. 60/350,960, filed Jan. 25, 2002.

BACKGROUND

Marinating has long been used to extend the shelf life of meats using salts, spices, and acids such as vinegar. New methods evolved to not only extend the shelf life of meats, but also to add value to these products. In addition to extended shelf lives, marinated meats also have a full, robust flavor from added spices and flavorings, they allow an enhanced eating experience by having improved tenderness and juiciness relative to non-marinated meats, and they have an enhanced visual appearance. Meat processors can profit from offering value-added marinated meat products. There is thus a need in the art for meat marinating methods that result in more visually appealing, flavorful, and juicy meat products.

Others have made efforts to make visually appealing, flavorful, and juicy meat products. Prior efforts have focused mainly on two marination techniques: injection and vacuum tumbling. U.S. Pat. No. 4,254,700 to Fleming, U.S. Pat. No. 5,507,221 to Lagares-Corominas, and U.S. Pat. No. 6,014,926 to Tanaka et al. all discuss apparatuses for injecting meat with marinades. U.S. Pat. No. 5,505,972 discusses a method by which different parts of poultry may be injected with different marinades or with different quantities of marinade. U.S. Pat. No. 4,960,599 to Cozzini et al. discloses a method by which a cold particle suspension in injected into meat, and U.S. Pat. No. 4,663,173 discusses a method by which a hot solution is injected into meat.

Vacuum marinating techniques suffer from the disadvantage that an in-line, industrial (conveyer belt) process must be interrupted, and meat must be marinated in batches. Nonetheless, vacuum marinating techniques are not uncommon. For example, U.S. Pat. No. 4,201,483 to Franzke and U.S. Pat. No. 5,603,567 to Peacock discuss methods for tenderizing meat in which the meat is tumbled and agitated under a vacuum. U.S. Pat. No. 6,040,013 to Karales discusses a related method in which meat is tumbled and agitated under a vacuum in the presence of a marinate.

Other efforts to impart flavor and visual appeal to meats include glazing. Glazes can be cooked or reheated under oven conditions to yield a surface coating with good sheen and an appealing visual appearance. U.S. Pat. No. 4,940,590 to Williams et al. discusses a method by which meat is marinated and coated with dry powders to produce a uniform thin glazing coat adhering to the meat. The coating is baked on as an elastic, rugged, adhering, glazed coating that remains through cooking, freezing, and reheating cycles.

The methods of the present invention improve upon prior methods for marinating meat by producing marinated meats with more visual appeal, and that are juicier and tastier than meats marinated by prior art methods. Furthermore, the present invention allows the process of marinating to be accomplished by a single, in-line industrial method, rather than a batch method, as is required by vacuum agitation marinating techniques.

SUMMARY OF THE INVENTION

The marinating methods of the invention can be performed in-line, and the devices of the invention can be in-line, conveyer type devices, thus enabling a processor to effectively marinate and enhance the flavor of bone-in and boneless meats and poultry continuously. A combination of ingredients and processes allow for the continuous in-line enhancement of the flavor, appearance, and texture of meat products with no changeover or vacuum requirements. The combination of the particular formulation of ingredients with the process as described below allows production of meat products capable of being stored frozen and cooked from the frozen state, and to develop a flavor profile that is the result of interactions of the various combinations of flavorings, seasonings, and functional ingredients.

The methods and devices of the invention further allow creation of a single flavored substrate with specific flavor requirements in each stage of the process, or various flavored products that may be produced in-line by only changing the dry stage of the process. The methods of the invention allow greater flavor enhancement than conventional prior art methods. The methods and devices of the invention prevent dehydration of meat products during frozen storage, and prevent individual pieces of meat from sticking together when they are packaged together. The methods and devices of the invention further allow color or other ingredients to enhance the visual appeal of the meats to be added.

This invention involves the discovery of a unique flavor system designed to deliver a desired flavor profile. The invention is of a functional system designed to keep different flavor components separate until they are cooked. The system allows for increased moisture retention in cooked meat. A dry set of ingredients chosen for flavor, and that may have a high salt content, is encased in a water/oil interface that allows for effective freezing without having to freeze the dry ingredients. The encasement of the meat and dry ingredients in a frozen shell with the ability to hold in water serves the dual role of protecting the meat from freeze thaw and freezer burn during extended storage, as well as providing a sauce for the meat when it is cooked.

The methods of the invention involve injecting meat with a first set of ingredients, coating the meat with a second set of ingredients, spraying a third set of ingredients over the coated meat, freezing the surface of the sprayed, coated meat, completely freezing the meat, then immersing the meat into a fourth set of ingredients. The combination of these steps and properly chosen ingredients results in a superior marinated meat product and a rapid and efficient production process.

DESCRIPTIONS OF THE DRAWINGS

DETAILED DESCRIPTION OF THE INVENTION

The methods and devices of the invention allow for the continuous, in-line marinating of meats through the combination of several steps or stages, and by use of particular marinating ingredients. The methods and devices can create single flavored substrates by the addition of particular ingredients in each stage of the processes, or various flavored products that can be produced in-line by changing only the dry stage ingredients.

Figure 1:
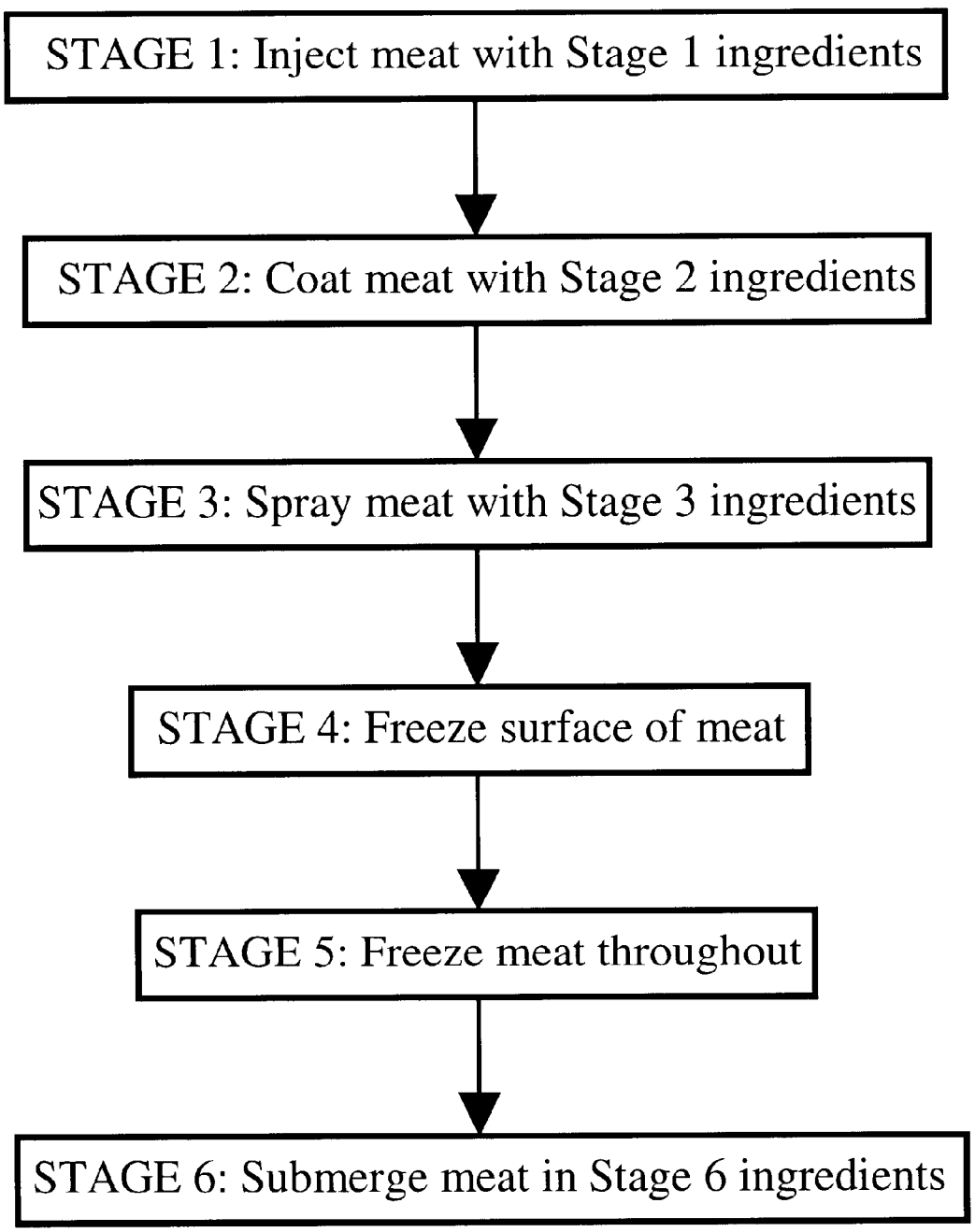
FIG. 1 is a schematic diagram, detailing the steps in the marinating method of one embodiment of the invention.

FIG. 1 is a schematic diagram outlining the steps of the method of one embodiment of the invention. A first set of ingredients (the "Stage 1" ingredients) as set forth in Table 1 may be injected into the meat using any meat marinade method known to those skilled in the art. The Stage 1 ingredients may be added to the meat in a quantity of between 3 and 20% of the weight of the meat. Particularly suitable methods for introducing the Stage 1 ingredients would be any industrial meat marinating method adapted to an in-line production process, such as by injection.

TABLE 1

Stage 1 ingredients

| Ingredient | Percent by Weight of Ingredients |
| --- | --- |
| Water | 70.0–90.0 |
| Salt | 0.5–2.0 |
| Sodium phosphates | 2.0–4.0 |
| Gellan Gum | 0.2–2.0 |
| Maltodextrin | 1.0–5.0 |
| Gelatin | 0.5–2.0 |
| Flavor Base | 0.2–5.0 |

Figure 2A:
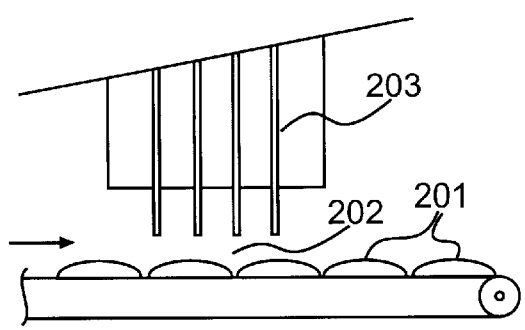
FIG. 2 is a side view of the injection stage, step 1 of the process of FIG. 1.
Figure 2B:
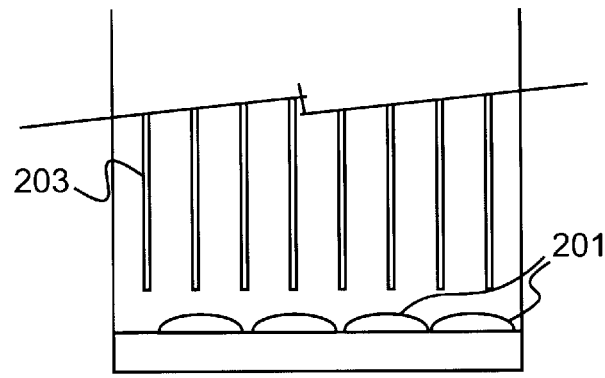

FIG. 2 is a schematic representation of an in-line injection marinating process. Meat (201) is conveyed to a Stage 1 location (202), where it is punctured with needles (203), and a solution of Stage 1 ingredients are injected into the meat (201).

The surface of the meat may then be coated with a second set of ingredients (the "Stage 2" ingredients), as set forth in Table 2. The Stage 2 ingredients may be added to the meat in a quantity of between 1 and 10% of the weight of the meat. The Stage 2 ingredients may be added to the meat by means known to those in the art, but particularly preferred are methods that can be performed in-line in a continuous process for the addition of dry ingredients.

TABLE 2

Stage 2 ingredients

| Ingredient | Percent by Weight of Ingredients |
| --- | --- |
| Dry Partially Hydrogenated Vegetable Oil | 5.0–20.0 |
| Modified Food Starch (Instant) | 2.0–10.0 |
| Maltodextrin | 10.0–40.0 |
| Seasonings (Including Salt) | 10.0–40.0 |
| Flavor Profile | 0.10–5.0 |
| Breadcrumbs | 30.0–50.0 |

Figure 3A:
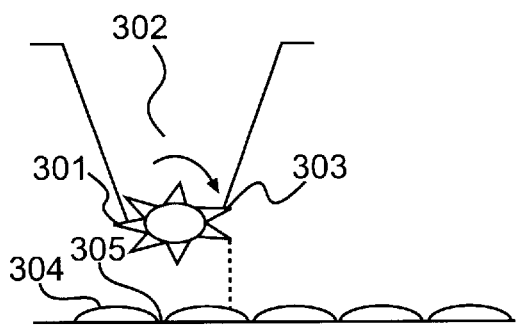
FIG. 3A is a side view of the dry stage, step 2 of the process of FIG. 1.
Figure 3B:
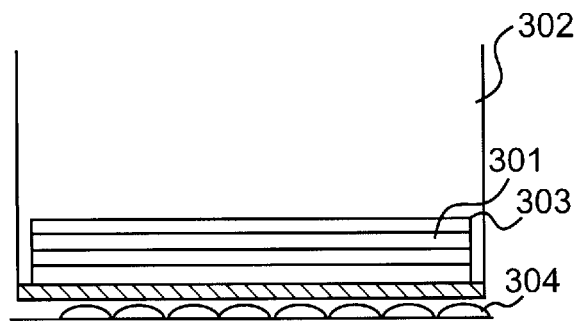
FIG. 3B is a front view of the dry stage, step 2 of the process of FIG. 1.

In one preferred embodiment, the Stage 2 ingredients are added to the meat by means of a dispenser roller, as shown in FIGS. 3A and 3B. The dispenser roller (301) is an elongated, gear-like device, with a chamber (302) for holding the ingredients to be dispensed. The dispenser roller rotates and the dry Stage 2 ingredients are caught between the teeth (303) of the gear-like device (301) when the teeth are rotated upward into the ingredients holding chamber (302). The dispenser roller continues to rotate, and the dry Stage 2 ingredients caught between the teeth of the gear-like device fall onto the meat below (304) when the teeth are rotated downward to face the meat on the conveyer (305).

The surface of the meat may then be coated with a third set of ingredients (the "Stage 3" ingredients), as set forth in Table 3. The Stage 3 ingredients may be added to the meat in any quantity. In a preferred embodiment, the Stage 3 ingredients are added to the meat in a quantity sufficient to substantially coat a surface of the meat, preferably the top surface.

TABLE 3

Stage 3 Ingredients

| Ingredient | Percent by Weight of Ingredients |
| --- | --- |
| Water | 0–100 |
| Vegetable Oil (Liquid) | 0–100 |
| Egg Albumin | 0.2–2.0 |
| Modified Food Starch | 0.5–2.0 |
| Hydrolyzed Gelatin | 0.2–2.0 |
| Emulsifier | 0.01–0.1 |

Figure 4A:
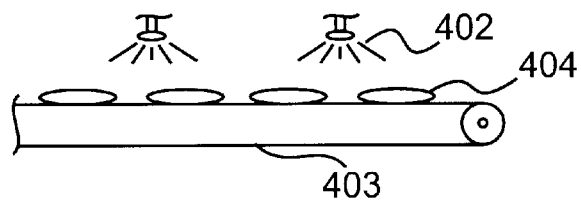
FIG. 4A is a side view of the misting stage, step 3 of the process of FIG. 1.
Figure 4B:
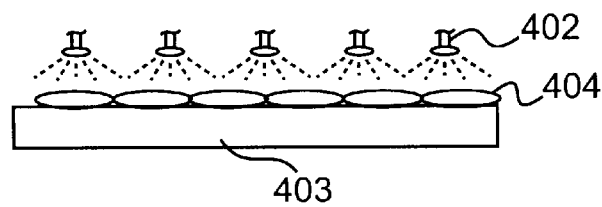
FIG. 4B is a front view of the misting stage, step 3 of the process of FIG. 1.

The surface of the meat may be coated with the Stage 3 ingredients by any means known to those of skill in the art. A preferred embodiment for the Stage 3 step is shown in FIGS. 4A and 4B. Misting sprinklers (402) are mounted over a conveyer (403) in a grid-like pattern so as to provide coverage of a substantial area of the conveyer (403) and of the meat thereon (404).

The surface of the meat may then be frozen in a fourth stage of the process of the invention. The surface of the meat is swiftly frozen to a temperature of about 0° F. to about 15° F., while the center of the meat may remain less cold, at about 26° F. to about 32° F. The freezing of the surface of the meat can be accomplished by any means known to those of skill in the art, but in a preferred embodiment, the freezing is accomplished by use of a liquid nitrogen cryogenic freezer.

The meat may then be more frozen in a fifth stage of the process of the invention. The center of the meat may be frozen to a temperature of about −10° F. to about 0° F. The freezing of the meat may be accomplished by any means known to those of skill in the art, but in preferred embodiments, the freezing is accomplished by use of a mechanical ammonia freezer or a carbon dioxide cryogenic freezer.

The meat may then be frozen-glazed in a sixth stage of the process of the invention. The frozen meat from the fifth stage is dipped continuously into a solution of ingredients (the "Stage 6 ingredients") as set forth in Table 4. The Stage 6 ingredients may be added to the meat in a quantity of 0.5–10% by weight of the meat.

TABLE 4

Stage 6 Ingredients

| Ingredient | Percent by Weight of Ingredients |
| --- | --- |
| Water | 75.0–95.0 |
| Xanthan Gum | 0.1–1.0 |
| Modified Food Starch | 5.0–25.0 |
| Flavor - Top Notes | 1.0–3.0 |

Figure 5A:
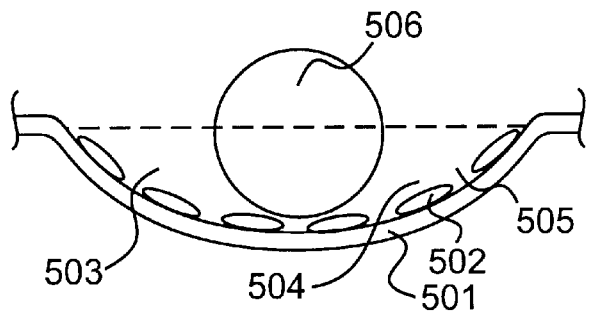
FIG. 5 is the application of the final flavor, step 6 of the process of FIG. 1.
Figure 5B:
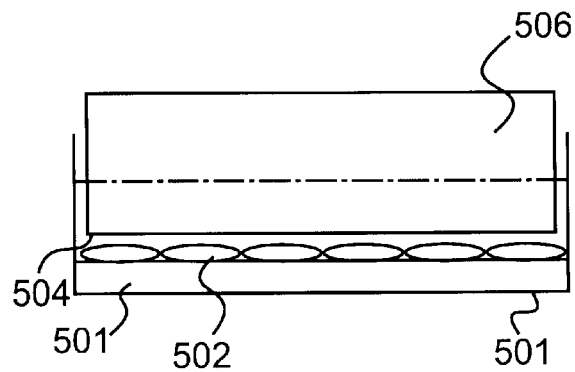

The Stage 6 ingredients may be added to the meat by any method known to those of skill in the art. In a preferred embodiment, the Stage 6 ingredients are added to the meat in an in-line, continuous process as shown in FIG. 5. A conveyer (501) moves meat (502) preferably downwardly (503) through a pool of the Stage 6 ingredients (504) and then upwardly (505) out of the pool of the Stage 6 ingredients. In a preferred embodiment, a roller (506) is employed to keep the meat on the conveyer (501) while immersed in the pool of the Stage 6 ingredients (504). Optionally, a high velocity air blower (not shown) may be used to remove excess coating from stage 6.

The result of this process as described is marinated, flavored, frozen-glazed meat with a frozen protective film all around the meat to protect against freezer burn and excessive drying while frozen. Furthermore, the frozen-glazed coating prevents the pieces of meat packaged together from sticking together. The process also allows for the addition of ingredients that allow the introduction of color or other visual enhancements. The process allows the ingredients added at the various stages of the process to be physically separate until the meat is cooked. The separation of the ingredients is facilitated by the two stage freezing process described above, together with the use of a water, oil, or a mixture, to separate the Stage 2 ingredients from the Stage 4 ingredients. Once the product is heated, however, the ingredients melt and combine during the cooking process.

The meat is preferably heated to a minimum of 160° F. during cooking in order for the different ingredients to optimally interact. The meat may be heated in a conventional oven, a convection oven, or a microwave oven.

EXAMPLE

A meat substrate is conveyed to a first stage location, where it is injected with a solution of flavorings and functional ingredients selected from Table 1. The meat is injected with 3–20% of the first stage solution as measured as a percentage of the weight of the meat.

The meat is conveyed to a second stage location, where its top surface is coated with a blend of seasonings, breadcrumbs, flavorings, and functional ingredients selected from Table 2. The meat is coated with 1–10% of the second stage ingredients as measured as a percentage of the weight of the meat.

The meat is conveyed to a third stage location, where its top surface is misted with water, oil, and/or a solution of various functional ingredients selected from Table 3. The meat is misted with a light coat of the third stage ingredients sufficient to substantially coat the top surface of the meat.

The meat is conveyed to a fourth stage location, where the surface of the meat is immediately frozen in a cryogenic freezer. The temperature at the surface of the meat is reduced to 0–15° F., and the temperature at the center of the meat is reduced to 26–32° F.

The partially frozen meat is conveyed to a fifth stage location, where the meat is completely frozen in a mechanical or cryogenic freezer. The temperature at the center of the meat is reduced to −10–0° F.

The completely frozen meat is conveyed to a sixth stage location, where it is dipped continuously into a solution of flavors and functional ingredients selected from Table 4 to achieve a level of glazing between 0.5 and 10% by weight of the meat of the sixth stage solution. The glazing forms a protective frozen film around the outer surface of the meat, thus preventing dehydration during frozen storage, preventing meats packaged together from sticking together, and allowing the introduction of color and other visually appealing effects to the meat.

Each reference cited above is incorporated herein in its entirety. While the preceding sections describe several embodiments, they are not meant to limit the scope of the invention in any way. It will be apparent to those skilled in the art that various modifications and variations can be made in the devices and methods of the invention without departing from their spirit and scope. The following claims are intended to cover modifications and variations of the invention that are within the scope of these claims and their equivalents.

What is claimed is:

1. A method of marinated meat processing comprising:
   (a) injecting meat with a first liquid solution of ingredients including water, salt, sodium phosphates, gellan gum, maltodextrin, gelatin, and flavoring;
   (b) injecting the meat with a dry combination of ingredients including dry partially hydrogenated vegetable oil, modified food starch, maltodextrin, seasonings, flavoring, and breadcrumbs;
   (c) spraying the meat with a second liquid solution of ingredients including water, vegetable oil, egg albumin, modified food starch, hydrolyzed gelatin, and emulsifier;
   (d) surface freezing the meat;
   (e) freezing the meat so that the center of the meat is below 0° F.; and then
   (f) dipping the meat into a third liquid solution of ingredients including water, xanthan gum, modified food starch, and flavoring.

2. The method of claim 1, wherein said first liquid solution of ingredients is added to the meat in a quantity of between 3 and 20 weight percent.

3. The method of claim 2, wherein said first liquid solution of ingredients consists essentially of 70–90 weight percent water, 0.5–2.0 weight percent salt, 2.0–4.0 weight percent sodium phosphates, 0.2–2.0 weight percent gellan gum, 1.0–5.0 weight percent maltodextrin, 0.5–2.0 weight percent gelatin, and 0.2–5.0 weight percent flavoring.

4. The method of claim 2, wherein said dry combination of ingredients is added to the meat in a quantity of between 1 and 10 weight percent, said second liquid solution of ingredients is added to the meat in a quantity sufficient to coat a surface of the meat, and said third liquid solution of ingredients is added to the meat in a quantity of between 0.5 and 10 weight percent.

5. The method of claim 1, wherein said dry combination of ingredients is added to the meat in a quantity of between 1 and 10 weight percent.

6. The method of claim 5, wherein said dry combination of ingredients consists essentially of 5–20 weight percent dry partially hydrogenated vegetable oil, 2–10 weight percent modified food starch, 10–40 weight percent maltodextrin, 10–40 weight percent seasonings, 0.1–5.0 weight percent flavoring, and 30–50 weight percent breadcrumbs.

7. The method of claim 1, wherein said second liquid solution of ingredients is added to the meat in a quantity sufficient to substantially coat a surface of the meat.

8. The method of claim 7, wherein said second liquid solution of ingredients consists essentially of 0–100 weight percent water, 0–100 weight percent vegetable oil, 0.2–2.0 weight percent egg albumin, 0.5–2.0 weight percent modified food starch, 0.2–2.0 weight percent hydrolyzed gelatin, and 0.01–0.1 weight percent emulsifier.

9. The method of claim 1, wherein said third liquid solution of ingredients is added to the meat in a quantity of between 0.5 and 10 weight percent.

10. The method of claim 9, wherein said third liquid solution of ingredients consists essentially of 85–95 weight percent water, 0.1–1.0 weight percent Xanthan gum, 5–25 weight percent modified food starch, and 1–3 weight percent flavoring.

* * * * *